United States Patent
Saitou

(10) Patent No.: US 8,971,871 B2
(45) Date of Patent: Mar. 3, 2015

(54) RADIO BASE STATION, CONTROL APPARATUS, AND ABNORMALITY DETECTION METHOD

(75) Inventor: Naoyuki Saitou, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 396 days.

(21) Appl. No.: 13/179,362

(22) Filed: Jul. 8, 2011

(65) Prior Publication Data

US 2012/0071183 A1 Mar. 22, 2012

(30) Foreign Application Priority Data

Sep. 16, 2010 (JP) ................................. 2010-207777

(51) Int. Cl.
*H04W 24/00* (2009.01)
*H04W 24/04* (2009.01)

(52) U.S. Cl.
CPC ..................................... *H04W 24/04* (2013.01)
USPC ........................... 455/423; 455/436; 370/312

(58) Field of Classification Search
CPC ..... G06F 11/0709; H04W 24/04; H04L 69/40
USPC ........ 455/456.1, 67.14, 436, 432.1, 423, 560; 370/312, 310, 242, 331; 340/514
See application file for complete search history.

(56) References Cited

U.S. PATENT DOCUMENTS

| | | | | |
|---|---|---|---|---|
| 4,045,794 A | * | 8/1977 | Ohta | ............................. 340/514 |
| 5,095,500 A | * | 3/1992 | Tayloe et al. | ............... 379/32.01 |
| 5,805,666 A | * | 9/1998 | Ishizuka et al. | .............. 379/1.01 |
| 6,611,688 B1 | * | 8/2003 | Raith | .......................... 455/456.1 |
| 8,457,638 B2 | * | 6/2013 | Iwamura et al. | ............... 455/436 |
| 8,472,359 B2 | * | 6/2013 | Bharghavan et al. | ......... 370/310 |
| 8,515,415 B2 | * | 8/2013 | Dimou et al. | .................. 455/423 |
| 2001/0016493 A1 | * | 8/2001 | Kim et al. | ..................... 455/436 |
| 2001/0030953 A1 | * | 10/2001 | Chang | .......................... 370/331 |
| 2002/0091326 A1 | * | 7/2002 | Hashimoto et al. | ........... 600/483 |
| 2004/0043767 A1 | * | 3/2004 | Tsutsumi et al. | ........... 455/432.1 |
| 2004/0053614 A1 | * | 3/2004 | Il-Gyu et al. | ................... 455/436 |
| 2004/0203784 A1 | * | 10/2004 | Sasaki et al. | .................. 455/436 |
| 2005/0153743 A1 | * | 7/2005 | Berra et al. | .................... 455/560 |
| 2007/0129075 A1 | * | 6/2007 | Kim et al. | ..................... 455/436 |
| 2007/0293226 A1 | * | 12/2007 | Lee et al. | ...................... 455/436 |

(Continued)

FOREIGN PATENT DOCUMENTS

JP 11-146443 A 5/1999
JP 2005-340993 A 12/2005

(Continued)

OTHER PUBLICATIONS

Japanese Office Action mailed Nov. 19, 2013 for corresponding Japanese Application No. 2010-207777, with Partial English-language Translation.

*Primary Examiner* — Mahendra Patel

(74) *Attorney, Agent, or Firm* — Fujitsu Patent Center

(57) ABSTRACT

A radio base station that forms a cell by transmitting a radio wave and that communicates with a mobile terminal existing in the cell, the radio base station includes a reception unit configured to receive information including cell information relating to a state of a peripheral cell of the radio base station, the information being transmitted from the mobile terminal, and a calculation processing device configured to detect an abnormality relating to another radio base station corresponding to the peripheral cell based on the cell information.

11 Claims, 8 Drawing Sheets

(56) References Cited

U.S. PATENT DOCUMENTS

| | | | |
|---|---|---|---|
| 2009/0052330 A1 | 2/2009 | Matsunaga et al. | |
| 2009/0061878 A1* | 3/2009 | Fischer | 455/436 |
| 2009/0117900 A1* | 5/2009 | Obata et al. | 455/436 |
| 2009/0191881 A1* | 7/2009 | Shibata | 455/446 |
| 2010/0167744 A1* | 7/2010 | Grob-Lipski et al. | 455/436 |
| 2010/0173626 A1* | 7/2010 | Catovic et al. | 455/423 |
| 2010/0178920 A1* | 7/2010 | Kitazoe et al. | 455/436 |
| 2010/0190451 A1* | 7/2010 | Huber et al. | 455/67.14 |
| 2010/0267378 A1* | 10/2010 | Hamabe et al. | 455/423 |
| 2010/0291931 A1* | 11/2010 | Suemitsu et al. | 455/436 |
| 2011/0064016 A1* | 3/2011 | Kim et al. | 370/312 |
| 2011/0256871 A1* | 10/2011 | Cooper et al. | 455/436 |
| 2012/0094706 A1* | 4/2012 | Fukumoto et al. | 455/512 |

FOREIGN PATENT DOCUMENTS

| | | |
|---|---|---|
| JP | 2006-340050 A | 12/2006 |
| WO | WO 2009057544 A1 * | 5/2009 |

* cited by examiner

RADIO BASE STATION, CONTROL APPARATUS, AND ABNORMALITY DETECTION METHOD

CROSS-REFERENCE TO RELATED APPLICATIONS

This application is based upon and claims the benefit of priority of the prior Japanese Patent Application No. 2010-207777, filed on Sep. 16, 2010, the entire contents of which are incorporated herein by reference.

FIELD

The embodiments discussed herein are related to a radio base station, a control apparatus, and an abnormality detection method.

BACKGROUND

In a radio base station used in a mobile communication system, an abnormality of the base station function, such as discontinuation of a transmission radio wave, may occur for some reason, for example, due to a malfunction of internal software or hardware. When an abnormality such as transmission radio wave discontinuation occurs in a radio base station, it is preferable that the abnormality be detected early in view of network operation. In the mobile communication system where the abnormality is detected, it is preferable that countermeasures against the detected abnormality be taken early to compensate for the detected abnormality. The countermeasures include a so-called compensational operation to operate radio base stations on the periphery of the radio base station where the abnormality is detected, a recovery from the abnormal state, and so forth.

An example of the compensational operation is described below. After the abnormality of the radio base station is detected, other radio base stations on the periphery of the radio base station where the abnormality occurs may communicate with a mobile terminal that has communicated with the radio base station where the abnormality occurs, so that a decreased operation of the mobile communication system is temporarily performed. Further, a method of making a recovery from an abnormality by using an element management system (EMS) managing a device or an element provided on a network may be considered. According to the method, upon being notified that an abnormality of a transmission radio wave or the like occurs in a radio base station managed by the EMS, the EMS resets the settings on radio wave transmission performed by the radio base station to recover from the abnormality.

On the other hand, notification of the abnormality is in some cases not appropriately performed depending on the type of abnormality occurring in a radio base station. For example, when a failure occurs in the abnormality detection function due to the occurrence of an abnormality relating to the radio base station, the abnormality detection is not performed. Further, when a failure occurs in the abnormality notification function, an appropriate notification is not made. Hereinafter, an abnormal state where a self diagnosis or an abnormality notification is not performed by a radio base station will be referred to as a non-alarm abnormal state.

The technology for detecting the non-alarm abnormal state has been studied as a functional element for the self organizing network (SON) use case in a so-called next generation radio communication network such as Third Generation Partnership Project—Long Term Evolution (3GPP-LTE) standard specifications, Next Generation Mobile Networks (NGMN), etc.

Japanese Unexamined Patent Application Publication No. 2006-340050, Japanese Unexamined Patent Application Publication No. 11-146443, and Japanese Unexamined Patent Application Publication No. 2005-340993 describe technologies relating to a method of detecting the occurrence of abnormality including the occurrence of non-alarm abnormal state; compensational operations when abnormality is detected; and processes to recover from an abnormality.

SUMMARY

According to an aspect of an embodiment, a radio base station that forms a cell by transmitting a radio wave and that communicates with a mobile terminal existing in the cell, the radio base station includes a reception unit configured to receive information including cell information relating to a state of a peripheral cell of the radio base station, the information being transmitted from the mobile terminal, and a calculation processing device configured to detect an abnormality relating to another radio base station corresponding to the peripheral cell based on the cell information.

The object and advantages of the embodiment will be realized and attained by at least the features, elements, and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1A:
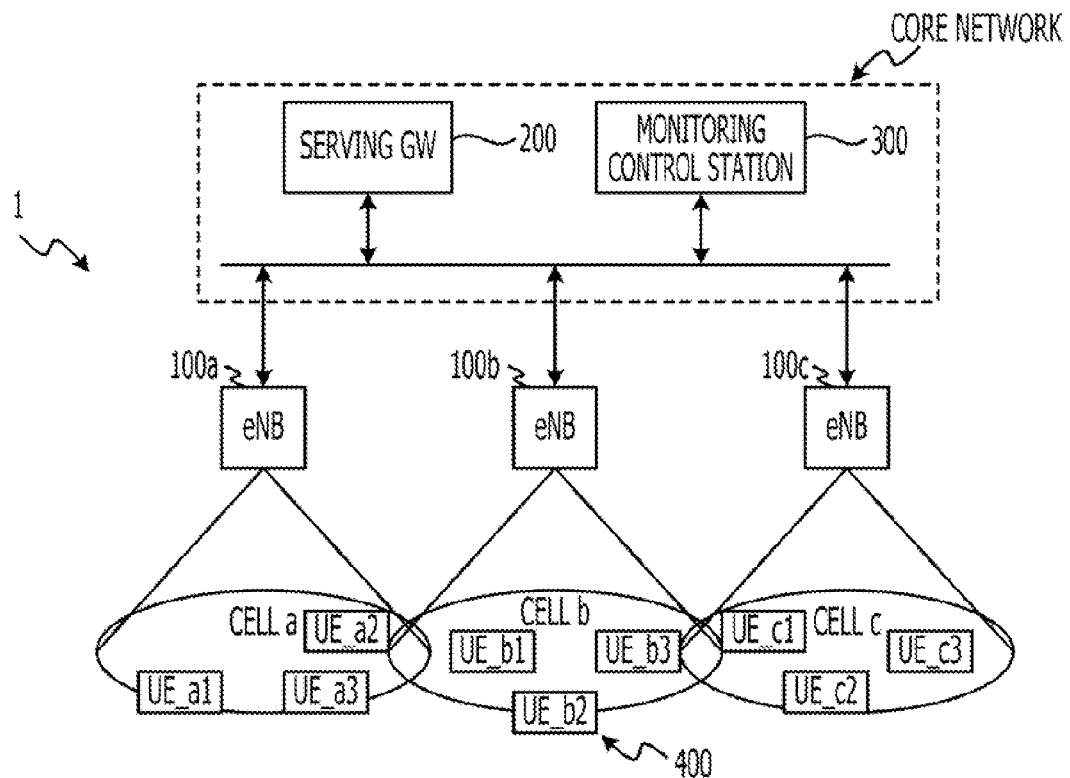
FIGS. 1A and 1B are block diagrams illustrating an exemplary configuration of a mobile communication system according to an embodiment.

According to the non-alarm abnormal state-detection methods described in the related art, a network monitoring device such as an EMS collects information relating to communication quality of a radio base station, and performs statistical and analytical processing such as standardization processing on the collected information so that abnormality occurrence is detected and the radio base station where the abnormality occurs is determined.

However, the information relating to communication quality is monitored for a relatively long period to perform the statistical and analytical processing. Further, much time is often taken to make an analysis for determining whether or not an abnormality occurs. On the other hand, when providing services relating to a network, it is desirable that an abnormality such as discontinuation of a radio wave transmitted from a radio base station be detected soon after its occurrence.

The present invention provides a radio base station, a control apparatus, and an abnormality detection method, in which an abnormality relating to a radio base station can be detected soon after occurring.

The radio base station disclosed herein is provided on a network of a mobile communication system with at least one other radio base station, and includes a reception unit and a calculation processing device. The reception unit receives information that is transmitted from a mobile terminal and that includes cell information relating to the state of a peripheral cell of the radio base station. The calculation processing device detects an abnormality relating to another radio base station corresponding to the peripheral cell based on the cell information.

The control apparatus disclosed herein is provided on a network of a mobile communication system in such a manner that the control apparatus can receive information transmitted to a radio base station, and includes a reception unit and a calculation processing device. The reception unit receives information that is transmitted from a mobile station to a first radio base station and includes cell information relating to a state of a peripheral cell of a first radio base station. The calculation processing device detects an abnormality relating to a second radio base station corresponding to the peripheral cell based on the cell information.

The detection method disclosed herein, which detects an abnormality of a radio base station, includes receiving information that is transmitted from a mobile terminal to the first radio base station and that includes cell information relating to the state of a peripheral cell of a first radio base station; and detecting an abnormality relating to a second radio base station corresponding to the peripheral cell based on the cell information.

According to the above-described radio base station, control apparatus, and abnormality detection method, an abnormality relating to an another radio base station corresponding to the peripheral cell based on the cell information.

Hereinafter, embodiments of the present invention are described with reference to the attached drawings. Although an LTE communication system will be described in the following embodiments as an exemplary mobile communication system, the following embodiments may be applied to other mobile communication systems of various types.

(1) Exemplary Basic Configuration

An exemplary configuration of a mobile communication system 1 according to an embodiment is described with reference to the block diagrams illustrated in FIGS. 1A and 1B.

The mobile communication system 1 illustrated in FIG. 1A includes radio base stations (evolved Nodes B (eNB)) 100a, 100b, and 100c, a serving gateway (GW) 200, and a monitoring control station 300.

The eNB 100a is an example of radio base station that is included in the mobile communication system 1 and is connected to a core network. The eNB 100a transmits a radio wave via an antenna to form a cell illustrated below eNB 100a, and communicates with mobile terminals (user equipment (UE)) UE_a1, UE_a2, and UE_a3 existing in the cell a. The eNB 100b and the eNB 100c are radio base stations each having substantially the same function and configuration as those of the eNB 100a, and the eNB 100b forms a cell b and the eNB 100c forms a cell c. Each of the eNB 100b and the eNB 100c communicates with UEs existing in the corresponding cell.

More specifically, the eNB 100b forms the cell b shown below the eNB 100b and communicates with a UE_b1, a UE_b2, and a UE_b3 existing in the cell b. The eNB 100c forms the cell c illustrated below the eNB 100c and communicates with a UE_c1, a UE_c2, and a UE_c3 existing in the cell c.

Hereinafter, when the eNBs 100a to 100c are described without differentiating one from the other in the following embodiments, the eNBs 100a to 100c are expressed as an eNB 100 for the purpose of description. Likewise, when the UE_a1 to UE_c3 are described without differentiating one from the other, the UE_a1 to UE_c3 are expressed as a UE 400. The number of the eNBs 100 and the number of the UEs 400 illustrated in FIGS. 1A and 1B are exemplary, and not limited to those illustrated in FIGS. 1A and 1B.

The eNB 100 may be a radio base station performing communications under the LTE system. The eNB 100 includes a network processor that is connected to the core network via the serving GW 200 and that transmits a signal to and receives a signal from the core network. The eNB 100 also includes an antenna provided to transmit a radio wave to form a cell and communicate with UEs 400 existing in the cell. The configuration and function of the eNB 100 will be described later in detail.

The serving GW 200 is a gateway configured to provide radio access services and interchange an access to the Internet Protocol (IP) network on the core network with a radio access in the eNB 100.

The monitoring control station 300 is a control apparatus configured to monitor and manage the state of the eNB 100 and the serving GW 200. The monitoring control station 300 is connected by wire to the eNB 100 and the serving GW 200. For example, upon being informed of a failure, monitoring control station 300 performs a corresponding process.

Figure 1B:
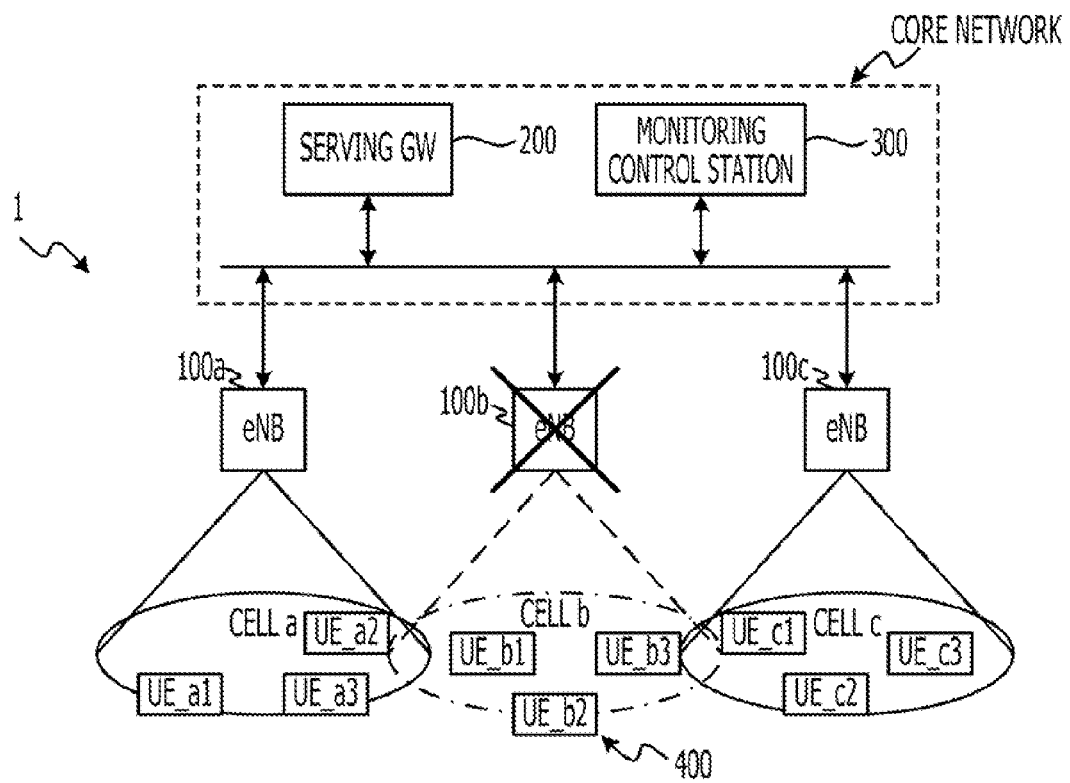

FIG. 1B illustrates an example of an abnormality such as a discontinuation of a transmission radio wave that occurs in the eNB 100b of the mobile communication system 1 illustrated in FIG. 1A. When the eNB 100b fails to function, such as having a difficulty in transmitting a radio wave, the cell b disappears. As the cell b disappears, the region where the cell b existed becomes a dead zone where communications are unable to be carried out, and communications performed by the UE_b1, the UE_b2, and the UE_b3 existing in the cell b are interrupted.

In that case, the monitoring control station 300 may be informed of the functional failure of the eNB 100b. Upon being informed of the functional failure, the monitoring control station 300 performs control to increase the transmission power of the eNBs 100a and 100c, for example, so that the UE 400 existing in the area where the cell b was formed becomes communicable with eNBs 100a and 100c. However, with the failure occurring in the eNB 100b, an abnormality may also occur in the function of informing the monitoring control station 300 of the failure occurrence, which may cause a so-called non-alarm abnormal state where it is difficult to conduct an appropriate notification.

Hereinafter, the mobile communication system 1 including the eNB 100 that can inform the monitoring control station 300 of the abnormality occurrence at the time when the non-alarm abnormal state occurs will be described.

A hardware configuration of the eNB 100 according to an embodiment will be described with reference to a block diagram of FIG. 2.

Figure 2:
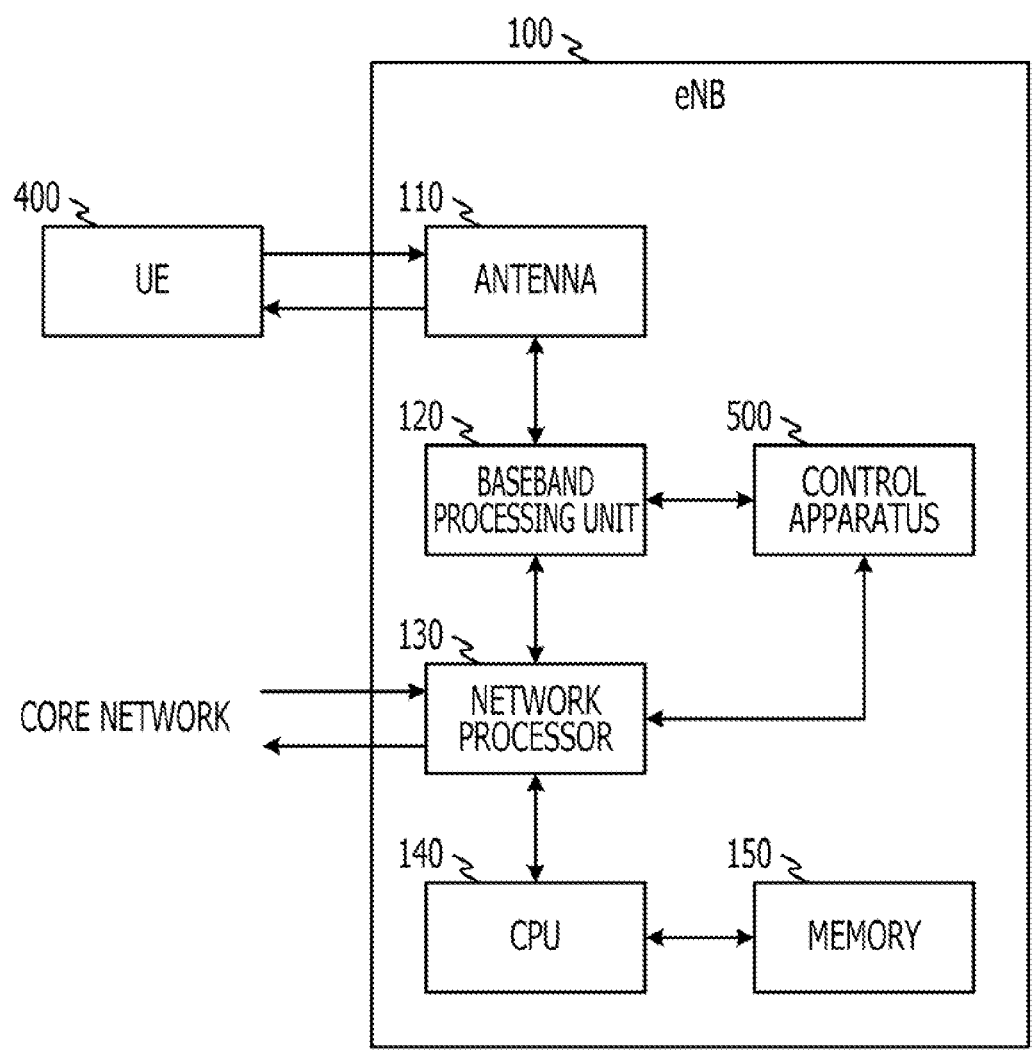
FIG. 2 is a block diagram illustrating an exemplary hardware configuration of a radio base station (eNB) according to an embodiment.

As illustrated in FIG. 2, the eNB 100 includes an antenna 110, a baseband processing unit 120, a network processor 130, and a central processing unit (CPU) 140, a memory 150, and a control apparatus 500.

The eNB 100 transmits a radio wave via the antenna 110 and forms a cell. Further, the eNB 100 receives a radio wave transmitted from the UE 400 via the antenna 110.

The baseband processing unit 120 is a signal processing circuit configured to perform, for example, processing relating to a layer 2, which includes media access control (MAC) processing, radio link control (RLC) processing, packet data convergence protocol (PDCP) processing, and so forth, or processing relating to a layer 3, which includes radio resource control (RRC) processing and the like. The baseband processing unit 120 converts a signal received via the antenna 110 into a signal to be transmitted to the core network. Further, the baseband processing unit 120 converts a signal received from the core network via the network processor 130 into a signal to be transmitted via the antenna 110. The baseband processing unit 120 is a digital circuit such as a field programmable gate array (FPGA), an application specific integrated circuit (ASIC), or a digital signal processor (DSP), for example.

The network processor 130 is an interface that is connected by wire to the serving GW 200 and communicates with the core network. The network processor 130 is a CPU, or may be FPGA, ASIC, or DSP, for example.

The CPU 140 is a processing device configured to control operations of the entire eNB 100 based on software stored in the memory 150, for example. The memory 150 is a memory device storing data used for the operations of the eNB 100 under the control of the CPU 140.

The control apparatus 500 is an exemplary calculation processing device which performs calculations based on information transmitted from, for example, the UE 400, and informs the monitoring control station 300 and the like of the calculation results via the network processor 130.

An exemplary hardware configuration of the control apparatus 500 according to an embodiment will be described with reference to a block diagram of FIG. 3.

Figure 3:
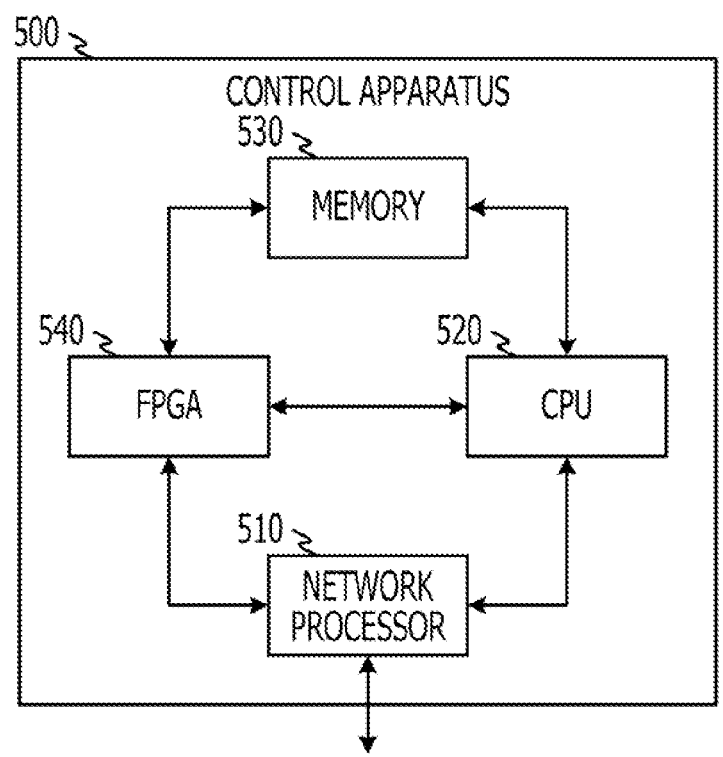
FIG. 3 is a block diagram illustrating an exemplary hardware configuration of a control apparatus according to an embodiment.

As illustrated in FIG. 3, the control apparatus 500 includes a network processor 510, a CPU 520, a memory 530, and an FPGA 540.

Upon receiving a signal transmitted via a communications protocol such as the IP, the network processor 510 converts the signal into an appropriate signal and outputs the signal to the CPU 520.

The CPU 520 performs certain calculation based on the input signal, and outputs the result to the FPGA 540. The memory 530 is a memory device storing software, data, and so forth that are used for processing performed by the CPU 520.

The FPGA 540 is an interface configured to perform signal control to externally output, via the network processor 510, a control signal output from the CPU 520. The FPGA 540 transmits the control signal to the monitoring control station 300 via the network processor 510.

The control apparatus 500 may be a set of devices and circuits that are independent of the hardware configuration of the eNB 100. In addition, the network processor 130, the CPU 140, or the memory 150, which is a component of the eNB 100, may be used as the control apparatus 500.

For example, the control apparatus 500 in the eNB 100a collects information transmitted from the UE 400 of cell b, which relates to changes in the state of a cell b that is formed under an eNB 100b on the periphery of eNB 100a. When the collected information about the cell formed under the peripheral eNB 100, namely cell b, indicates that the frequency of occurrence of a state change satisfies a certain trigger condition, the control apparatus 500 determines that an abnormality occurs in the peripheral eNB 100 (eNB 100b) based on the collected information, and informs the monitoring control station 300 of the abnormality occurrence. The details of operations of the control apparatus 500 will be described later.

Figure 4:
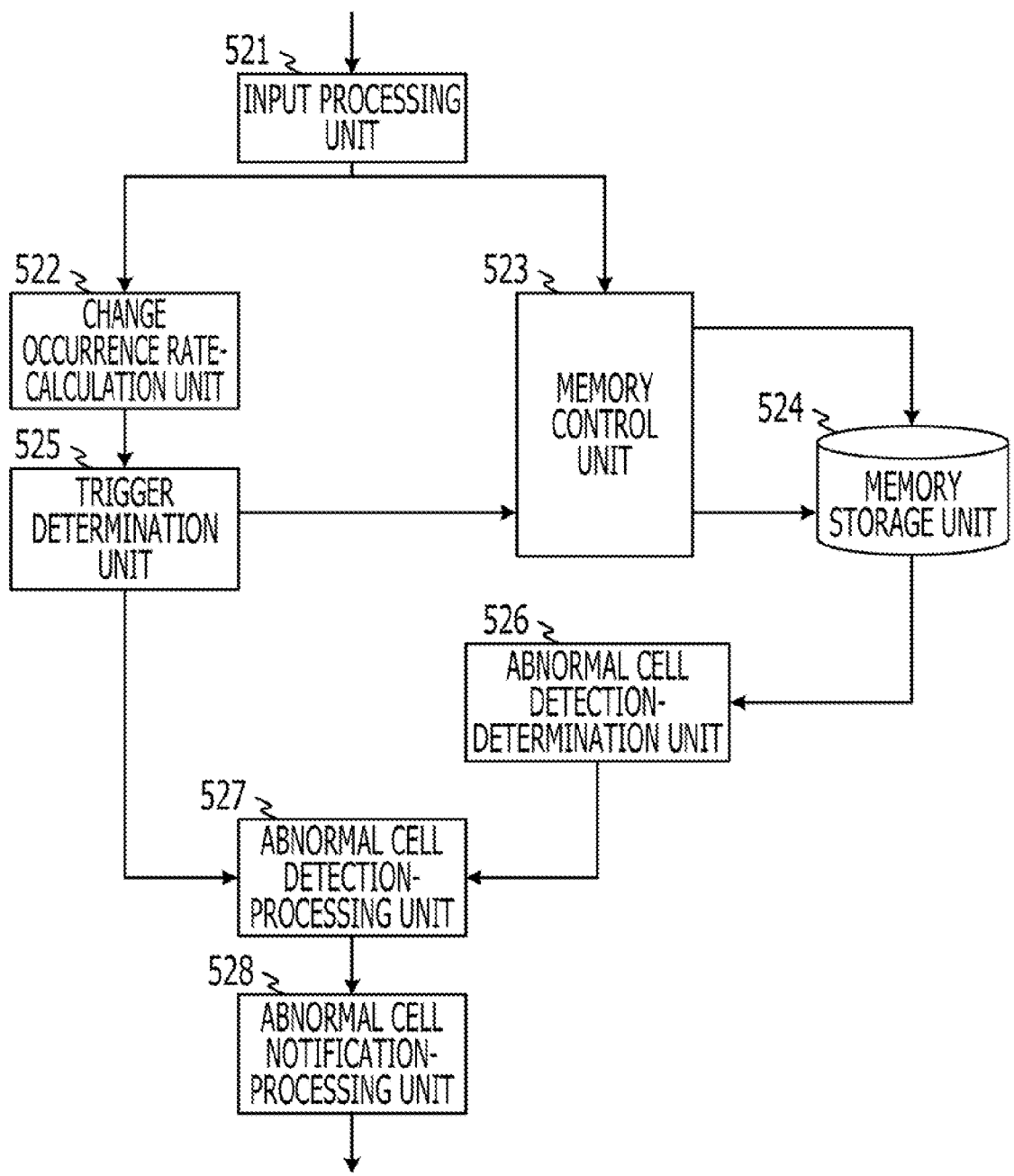
FIG. 4 is a block diagram illustrating an exemplary configuration of a control apparatus according to an embodiment.

The CPU 520 of the control apparatus 500 includes a plurality of functions for performing the above-described series of operations. An exemplary configuration of the function units included in the CPU 520 will be described with reference to FIG. 4. FIG. 4 illustrates functions of the CPU 520 as independent blocks, for convenience. The CPU 520 includes an input processing unit 521, a change occurrence rate-calculation unit 522, a memory control unit 523, a memory storage unit 524, a trigger determination unit 525, an abnormal cell detection-determination unit 526, an abnormal cell detection-processing unit 527, and an abnormal cell notification-processing unit 528 as the function units. The CPU 520 includes the above-described function units. Alternatively, the CPU 520 may perform the functions via physical processing devices or logical processing blocks that are executed through processing performed based on software.

The input processing unit 521 collects information input via the network processor 510, and outputs the collected information to the change occurrence rate-calculation unit 522 and the memory control unit 523. For example, when there is a connection request from a UE 400 that had been communicating with another eNB 100 which is different from the eNB 100 including the control apparatus 500, the input processing unit 521 collects specific information of the UE 400, which is information about the time when the UE requested, information of the eNB 100 that had previously communicated with the UE 400, and so forth. Further, the input processing unit 521 collects information about the state of a peripheral eNB 600 (see FIG. 5). The information is transmitted from a UE 400 in a cell under a peripheral eNB 100 communicating with the eNB 100 including the control apparatus 500. The information relates to the state of the peripheral eNB 600 and indicates reception power transmitted from the peripheral eNB 600, the signal to interference noise ratio (SINR), and a cell ID, etc. Here, the cell ID is a unique identification number assigned to the antenna 100 of the eNB 100, which is to identify the cell corresponding to each antenna 110. When information about a cell ID is transmitted from the UE 400 which is in communication, the UE 400 receives a radio wave transmitted from the cell corresponding to the cell ID, that is, the peripheral eNB 600. In other words, when information about the cell ID of a certain peripheral eNB 600 is transmitted from many UEs 400, a large number of UEs 400 are receiving a radio wave transmitted from the peripheral eNB 600.

The change occurrence rate-calculation unit 522 summarizes the input information in sequence and calculates, based on the cell information, the rate of changes occurring in the cell state of the peripheral eNB 600. The change occurrence rate of the cell state is a numerical value indicating the frequency of occurrence of changes in the wave-transmission state resulted from the reception power of the cell and a change in the cell information including the SINR or the cell ID. The change occurrence rate-calculation unit 522 according to an embodiment calculates a change occurrence rate on the time series based on the cell information of the peripheral eNB 600 at certain time intervals and transmits the calculation result to the trigger determination unit 525. The cell information is collected by the input processing unit 521 at all times. For example, the change occurrence rate-calculation unit 522 calculates the change occurrence rate of a cell by comparing cell information collected at a certain time and cell information collected in the past on the time series and obtaining the difference, or comparing the cell information collected at the certain time and cell information to be collected in the future on the time series and obtaining the difference, where each of the past cell information and the future cell information is transmitted from the same UE 400.

The memory control unit 523 supplies input data to the memory storage unit 524 and the data is stored in the memory 530. Further, the memory control unit 523 reads the data stored in the memory 530 via the memory storage unit 524.

Upon receiving data collected by the input processing unit 521, the memory control unit 523 stores the collected data in the memory 530 via the memory storage unit 524.

The memory storage unit 524 is a function unit configured to store data in and read data from the memory 530. The memory storage unit 524 stores and reads the data based on instructions from the memory control unit 523.

The trigger determination unit 525 acquires the change occurrence rate of the cell information indicating the reception power of the UE 400, the SINR, the cell ID, and so forth for each of peripheral cells based on data relating to the change occurrence rate of input cell information. According to an embodiment, the trigger determination unit 525 compares the change occurrence rate of the cell information to a certain threshold value for each peripheral eNB 600. When the value of the change occurrence rate of the cell information exceeds the threshold value, the trigger determination unit 525 determines that a cell indicated by the cell information satisfies the trigger condition, and notifies the abnormal cell-detection processing unit 527 that a trigger is activated for the cell. The trigger determination unit 525 instructs the memory control unit 523 to read cell information, about the cell for which the trigger is activated, within a certain time range preceding the activation of the trigger and within a certain time range subsequent to the activation of the trigger, from the memory 530 and transmit the cell information to the abnormal cell detection-determination unit 526.

After the trigger is activated, the abnormal cell detection-determination unit 526 estimates whether or not an abnormality has occurred in the cell, for which the trigger is activated, to determine whether or not the cell becomes a candidate for a cell where an abnormality occurs. After the trigger is activated, the abnormal cell detection-determination unit 526 according to an embodiment compares the cell information collected before the trigger is activated to the cell information collected after the trigger is activated, and estimates whether or not an abnormality occurs in the cell for which the trigger is activated. For example, when information about the cell ID of a target cell is included in cell information transmitted from the UE 400 before the time when the trigger is activated and is not included in cell information transmitted from the UE 400 after the time when the trigger is activated, the abnormal cell detection-determination unit 526 estimates that an abnormality has occurred in the cell. When the abnormal cell detection-determination unit 526 compares the cell information and estimates that the abnormality has occurred in the target cell, the target cell is determined to be a candidate for the abnormality occurring cell and the abnormal cell detection-processing unit 527 is notified of the cell ID.

The abnormal cell detection-processing unit 527 generates information that is used to determine the cell specified as a candidate for the abnormality occurring cell to be the abnormality occurring cell based on information input from the trigger determination unit 525 and the abnormal cell detection-determination unit 526.

The abnormal cell notification-processing unit 528 informs the monitoring control station 300 of the cell ID of the abnormality occurring cell determined by the abnormal cell detection-processing unit 527 via the network processor 510.

(2) Exemplary Operations

Operations of the above-described control apparatus 500 will be described with reference to the attached drawings.

Figure 5:
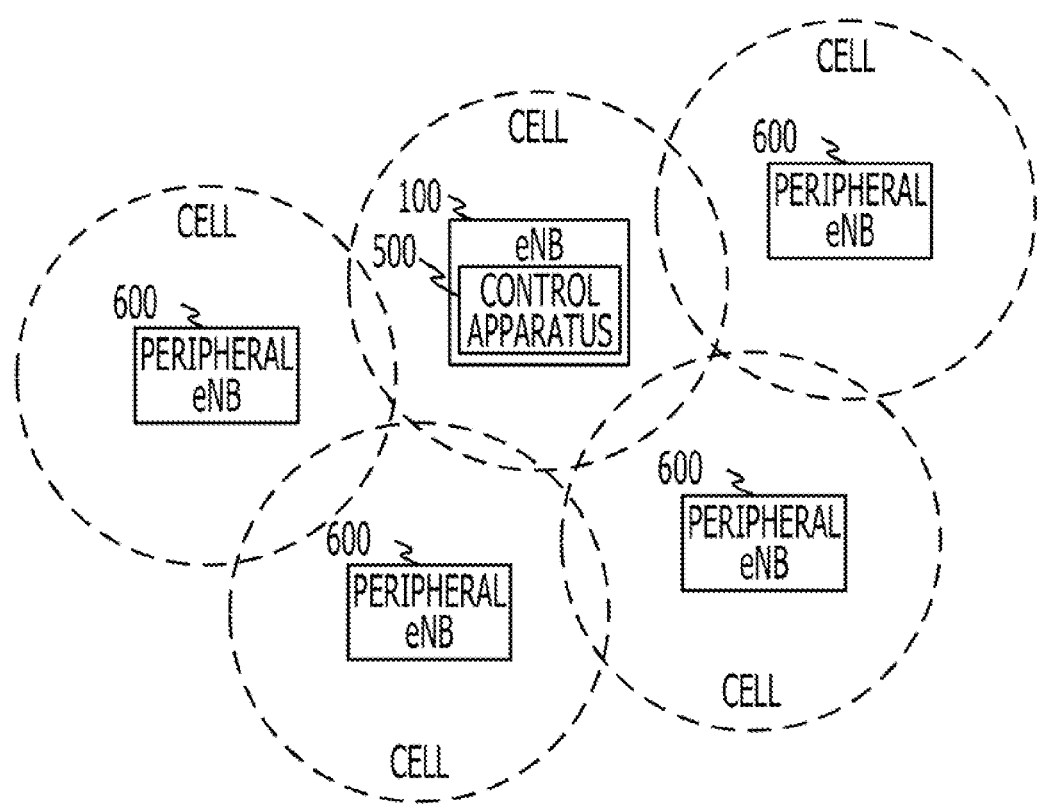
FIG. 5 illustrates the relationship between a radio base station including the control apparatus and peripheral radio base stations.

The control apparatus 500 detects an abnormality such as discontinuation of a transmission radio wave occurring in a radio base station (e.g., an eNB 100) on the periphery of the eNB 100 including the control apparatus 500 as described below. FIG. 5 illustrates the eNBs 100 relating to the operations of the control apparatus 500 and the arrangement of cells that are under the eNBs 100.

As illustrated in FIG. 5, the control apparatus 500 is provided in the eNB 100 and receives cell information indicating the communication state of each of cells that are under eNBs 100 on the periphery of the eNB 100. The cell information is transmitted from the UE 400 located under one of peripheral eNBs 100 communicating with the eNB 100 including the control apparatus 500. Hereinafter, the eNBs 100 on the periphery of the eNB 100 including the control apparatus 500 of which operations will be described are referred to as "peripheral eNBs 600", for convenience. Each of the eNB 100 and the peripheral eNBs 600 transmits a radio wave via the antenna 110 thereof to form a cell. Here, each of the peripheral eNBs 600 may have substantially the same configuration as that of the eNB 100, and may include the control apparatus 500 as is the case with the eNB 100.

The cells of the eNB 100 and the eNBs 600 provided on the periphery of the eNB 100 may not necessarily be adjacent to one another as illustrated in FIG. 5. According to an embodiment, when the UE 400 communicating with the eNB 100 can receive a radio wave transmitted from a different eNB 100 and cell information indicating the cell state including the reception power of the transmission radio wave, the SINR, and so forth can be measured, the different eNB 100 may be included as a peripheral eNB 600. In addition, among the peripheral eNBs 600 for the eNB 100, which are determined in the above-described manner, eNBs satisfying a certain condition (e.g., the condition that the cells thereof are adjacent to one another) may be included as the peripheral eNBs 600.

Figure 6:
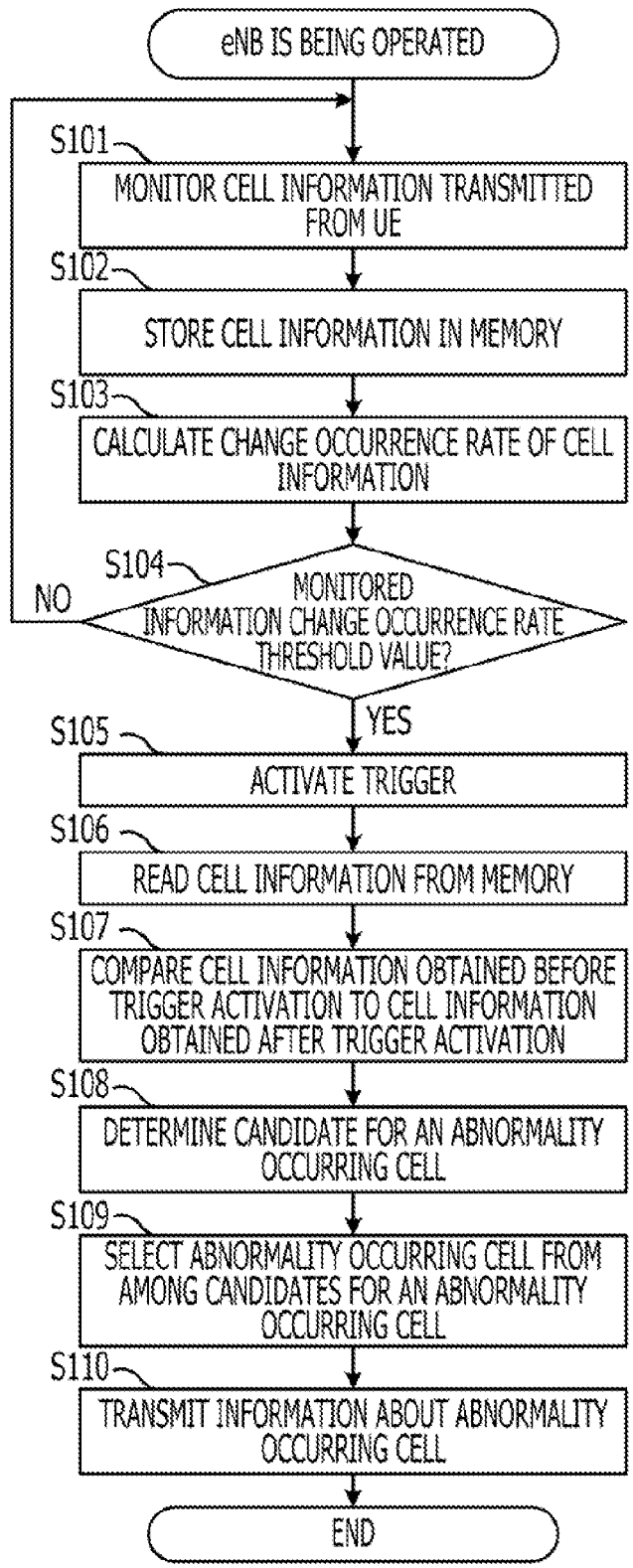
FIG. 6 is a flowchart illustrating exemplary operations of the control apparatus.

Operations of the control apparatus 500 of the eNB 100 will be described with reference to FIG. 6. FIG. 6 is an exemplary flowchart illustrating the basic flow of a process that is performed by the control apparatus 500.

As illustrated in FIG. 6, the control apparatus 500 collects cell information relating to the state of a peripheral eNB 600 included in information transmitted from a UE 400 under a peripheral eNB 100 to the eNB 100 (operation S101). The input processing unit 521 of the control apparatus 500 collects the cell information of the peripheral eNB 600 from a signal transmitted from the UE 400, the cell information indicating the reception power of the UE 400, the SINR, the cell ID, and so forth, and stores the collected cell information in the memory 530 via the memory control unit 523 (operation S102).

The change occurrence rate-calculation unit 522 of the control apparatus 500 calculates the change occurrence rate of the collected cell information at certain intervals (operation S103).

Upon receiving information about the calculated change occurrence rate, the trigger determination unit 525 of the control apparatus 500 compares the value of the change occurrence rate to a certain threshold value (operation S104). When the change occurrence rate of the cell information which is referred to is greater than the threshold value (operation S104: Yes), the trigger determination unit 525 determines that an abnormality occurs in one of the peripheral eNBs 600, and activates the trigger (operation S105).

Figure 7:
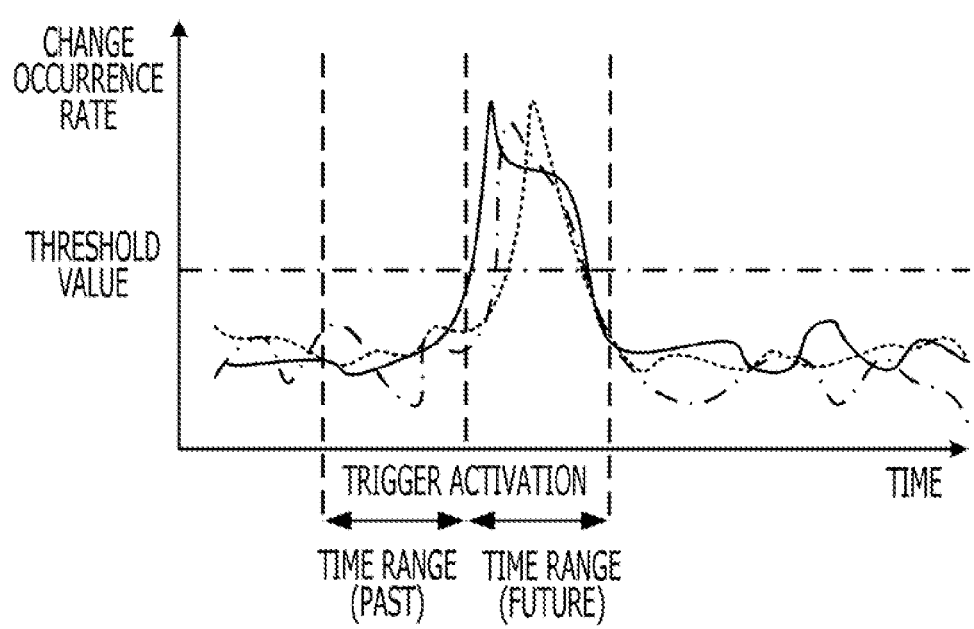
FIG. 7 is a graph illustrating data collected by the control apparatus and trigger conditions.

Here, the relationship between the cell information used for processing performed by the trigger determination unit 525 and the trigger determination will be described with reference to FIG. 7. FIG. 7 is a graph illustrating the change occurrence rate of the cell information collected and calculated by the control apparatus 500 of the eNB 100 on the time series. FIG. 7 illustrates the reception power transmitted from the peripheral eNB 600 (an alternate long and short dashed line); the cell ID of each of the peripheral eNBs 600 (a solid line); and a request to communicate with the eNB 100 including the control apparatus 500 (a dashed line), which are transmitted from the UE 400 in a cell under a peripheral eNB 100 in communication, as the change occurrence rate of the cell information.

As illustrated in FIG. 7, the trigger determination unit 525 compares the change occurrence rate of the input cell information to the threshold value. In FIG. 7, the trigger determination unit 525 detects that the change occurrence rate of the cell ID rises and exceeds the threshold value, and activates the trigger at the time when the value of the change occurrence rate exceeds the threshold value.

After the trigger is activated, the trigger determination unit 525 determines the time when the trigger is activated as the trigger activation time. Further, the trigger determination unit 525 determines a certain time range preceding the trigger activation time to be the past and determines a certain time range subsequent to the trigger activation time to be the future.

The change occurrence rate of the cell information, which is determined by the trigger determination unit 525, is calculated by the change occurrence rate-calculation unit 522 after the cell information is collected by the input processing unit 521. Therefore, the collection and the calculation may not necessarily be performed in real time. Further, the trigger determination unit 525 may read and determine data of the change occurrence rate of cell information that had been stored in the memory 530 as appropriate after a predetermined time elapses since the collection and the calculation. Therefore, data of the time range determined to be the future may not necessarily indicate the future, but indicates a time range which is in the future with reference to the trigger activation time.

Returning to FIG. 6, after the trigger is activated, the trigger determination unit 525 notifies the memory control unit 523 and the abnormal cell detection-processing unit 527 of the fact that the trigger is activated, the activation time, and the past time range preceding the trigger activation time and the future time range subsequent to the trigger activation time. Through the notification, the trigger determination unit 525 instructs the memory control unit 523 to read the cell information of the peripheral eNB 600 from the memory 530, the cell information being collected within the certain time range preceding the trigger activation time and the certain time range subsequent to the trigger activation time, and output the read cell information to the abnormal cell detection-determination unit 526 (operation S106).

The abnormal cell detection-determination unit 526 specifies the peripheral eNB 600 where an abnormality occurs based on changes in the cell information read from the memory 530 before and after the trigger activation (operation S107). At that time, the abnormal cell detection-determination unit 526 makes a determination for each cell information, and based on the determination, determines a candidate for an abnormality occurring cell under the peripheral eNB 600 that is estimated to have an abnormality.

For example, the abnormal cell detection-determination unit 526 compares past data obtained before the trigger is activated to future data obtained after the trigger is activated for each of the cell IDs of the peripheral eNBs 600 read from the memory 530, and checks whether a cell ID has disappeared after the trigger activation. The cell ID is transmitted from the UE 400 receiving a radio wave transmitted from the cell corresponding to the cell ID. When an abnormality occurs in the cell, which makes it difficult to transmit a radio wave, the UE 400 stops transmitting the cell ID. Therefore, when information about a given cell ID, which is stored in the memory 530, disappears after the trigger activation, it can be determined that the radio wave transmission is stopped for some reason in the cell corresponding to the cell ID. When a cell ID which disappears after the trigger activation is detected in the cell IDs of the peripheral eNBs 600 read from the memory 530, the abnormal cell detection-determination unit 526 notifies the abnormal cell detection-processing unit 527 of the cell corresponding to the cell ID as a candidate for an abnormality occurring cell.

Further, according to another example, the abnormal cell detection-determination unit 526 compares past data obtained before the trigger activation to future data obtained after the trigger activation for each reception power transmitted from the peripheral eNBs 600 read from the memory 530, and checks whether the reception power of a cell has sharply decreased when comparing that in a time range preceding the trigger activation and that subsequent to the trigger activation. When the reception power received by the UE 400 is sharply decreased within the time range subsequent to the trigger activation, it can be determined that the radio wave transmission is performed with difficulty in the cell for some reason. When detecting a cell where the reception power transmitted from the peripheral eNB 600 read from the memory 530 is sharply decreased in the time range subsequent to the trigger activation, the abnormal cell detection-determination unit 526 notifies the abnormal cell detection-processing unit 527 of the cell as a candidate for an abnormality occurring cell.

Further, in place of the reception power, the abnormal cell detection-determination unit 526 may compare SINR data before the trigger activation transmitted from the UE 400 during communication with the peripheral eNB 600 to that subsequent to the trigger activation.

Further, as another example, the abnormal cell detection-determination unit 526 may refer to a request to communicate with the eNB 100 including the control apparatus 500, the communication request being transmitted from the UE 400, and may make a comparison for each of cells with which the UE 400 communicates before the communication request is issued. In that case, the abnormal cell detection-determination unit 526 reads and selects communication requests that are issued within the time range preceding the trigger activation and the time range subsequent to the trigger activation from the communication request information read from the memory 530, and classifies the communication requests under cells with which the UE 400 communicates before the communication request is issued. Of the cells corresponding to the communication requests that are classified under the cells with which the UE 400 communicates before the communication request is issued, the abnormal cell detection-determination unit 526 determines the cell corresponding to a number of communication requests, the number exceeding a certain threshold value within each of the time range preceding the trigger activation and the time range subsequent to the trigger activation, to be a candidate for an abnormality occurring cell. Then, the abnormal cell detection-determination unit 526 notifies the abnormal cell detection-processing unit 527 of the cell as a candidate for an abnormality occurring cell.

At that time, the abnormal cell detection-determination unit 526 may exclude a communication request relating to regular handover processing from reference data before determining the candidate for an abnormality occurring cell. The above-described operation allows a proper procedure, such as the handover processing for operating the network, to be excluded and allows the candidate for an abnormality occurring cell to be appropriately detected based on a change, occurring due to the abnormality occurrence, in the number of communication requests that are issued from the UE 400.

As described above, the abnormal cell detection-determination unit 526 determines a candidate for an abnormality occurring cell based on each cell information, and notifies the abnormal cell detection-processing unit 527 of the candidate for an abnormality occurring cell. The abnormal cell detection-processing unit 527 compiles the determination results that are attained based on each cell information for the target cell that is determined to be the candidate for an abnormality occurring cell, and selects an abnormality occurring cell from among cells that are notified as the candidates for an abnormality occurring cell (operation S109). The abnormal cell notification-processing unit 528 notifies the monitoring control station 300 of the cell ID of a target cell via the network processor 510 as an abnormality occurring cell (operation S110).

As described above, the operations of the control apparatus 500 according to an embodiment allow the non-alarm abnormal state relating to the interruption of communications, such as discontinuation of a radio wave transmitted from the eNB 100, to be detected without delay after the occurrence of the non-alarm abnormal state.

The control apparatus 500 determines whether or not an abnormality occurs in any of the peripheral eNBs 600 by monitoring cell information relating to the state of each of the cells of the eNBs 600 on the periphery of the eNB 100 including the control apparatus 500, or by monitoring the change occurrence rate of communication requests that are transmitted from the UE 400 to the eNB 100. Further, when it is determined that the abnormality occurs, the control apparatus 500 activates the trigger, and compares changes in the cell information or the communication request number, in a certain time range determined to be the past with reference to the activation time of the trigger, to those in the cell information or the communication request number, in a certain time range determined to be the future with reference to the activation time of the trigger. The comparison allows the control apparatus 500 to detect some abnormality such as the failure of a radio apparatus occurring in any of the peripheral eNBs 600. The control apparatus 500 determines a candidate for an abnormality occurring cell based on the cell information regarding a peripheral eNB 600 which is determined to have an abnormality. Accordingly, the control apparatus 500 can appropriately detect the occurrence of the non-alarm abnormal state where it is difficult to properly transmit the radio wave for some reason and to make a self diagnosis or an abnormality notification in any of the peripheral eNBs 600 based on information or the like transmitted from the UE 400. Further, the control apparatus 500 detects the occurrence of an abnormality relating to the peripheral eNB 600 based on various kinds of cell information indicating reception power transmitted from the peripheral eNB 600 and received by the UE 400, the SINR, the number of communication requests that are issued for the eNB 100, and so forth. Consequently, the occurrence of an abnormality such as discontinuation of a transmission radio wave, which occurs due to the failure of a radio apparatus, can be detected with high precision.

Further, the control apparatus 500 operates to monitor the change occurrence rate of cell information transmitted from the UE 400 and information about the number of communication requests that are issued for the eNB 100, and determines that an abnormality occurs in the peripheral eNB 600 upon detecting that the value of the change occurrence rate is greater (or less) than a certain threshold value. Therefore, the abnormality occurrence can immediately be detected without collecting the cell information or the like over a long period.

The control apparatus 500 can detect the occurrence of an abnormality relating to the peripheral eNB 600 with higher precision by excluding communication requests relating to the handover processing. In addition, when determining whether or not an abnormality occurs based on the cell information or the communication request number information transmitted from the UE 400, information determined not to be a cause of the abnormality is excluded to increase the detection precision. For example, when a UE 400 is in a so-called idle state where communications between the UE 400 and radio base stations including the eNB 100, the peripheral eNB 600, etc. are inactive, information transmitted from the UE 400 is not used as determination information so that the detection precision is increased.

Further, the control apparatus 500 according to an embodiment checks changes of the cell IDs before the trigger activation and after the trigger activation, and changes in the cell information, which are included in the cell information transmitted from the UE 400, regarding the peripheral eNB 600 determined to be the candidate for an abnormality occurring cell. The control apparatus 500 specifies the abnormality occurring cell by comparing the cell ID or the cell information obtained in a time range determined to be the past with reference to the trigger activation time to the cell ID or the cell information obtained in a time range determined to be the future with reference to the trigger activation time. Consequently, the abnormality occurring cell can be specified by using fewer samples (that is, the cell ID or the cell information obtained within a reduced time range) than those used to perform statistical processing that has a relatively high processing amount and takes much time to perform calculations. Therefore, it becomes possible to detect abnormality occurrence and specify an abnormality occurring cell soon after the abnormality occurs in the peripheral eNB 600.

The monitoring control station 300 of the mobile communication system 1 according to an embodiment may perceive that an abnormality occurs in the eNB 100 based on information transmitted from the control apparatus 500, and perform recovery processing for the eNB 100 and reduced operation of the mobile communication system 1. The recovery processing or the reduced operation may be performed in a known manner.

Further, when determining whether or not an abnormality occurs in a peripheral eNB 600, the monitoring control station 300 may determine that the abnormality occurs not only when the abnormality occurrence information is transmitted from the eNB 100 on the periphery of the eNB 600, but also when the abnormality occurrence information is transmitted from at least one of peripheral eNBs 600. In the mobile communication system 1 according to an embodiment, a plurality of eNBs 100 are provided and the cells corresponding thereto are adjacent to one another to cover the entire area. When determining whether or not an abnormality occurs in a given peripheral eNB 600 included in the mobile communication system 1, it may be considered that a plurality of peripheral eNBs 600 each including the control apparatus 500 are provided around the given peripheral eNB 600, as is the case with the eNB 100. Therefore, when the abnormality occurs in the given peripheral eNB 600, it may be considered that the control apparatus 500 provided in each of an eNB 100 adjacent to the cell of the given peripheral eNB 600 and other peripheral eNBs 600 informs the monitoring control station 300 that the abnormality occurs in the given peripheral eNB 600. The monitoring control station 300 identifies the abnormality occurrence based on the abnormality occurrence information relating to the given peripheral eNB 600 transmitted from each of the control apparatuses 500. Consequently, the monitoring control station 300 can determine the abnormality occurrence and the abnormality occurring cell with increased precision.

(3) Exemplary Modifications

Figure 8:
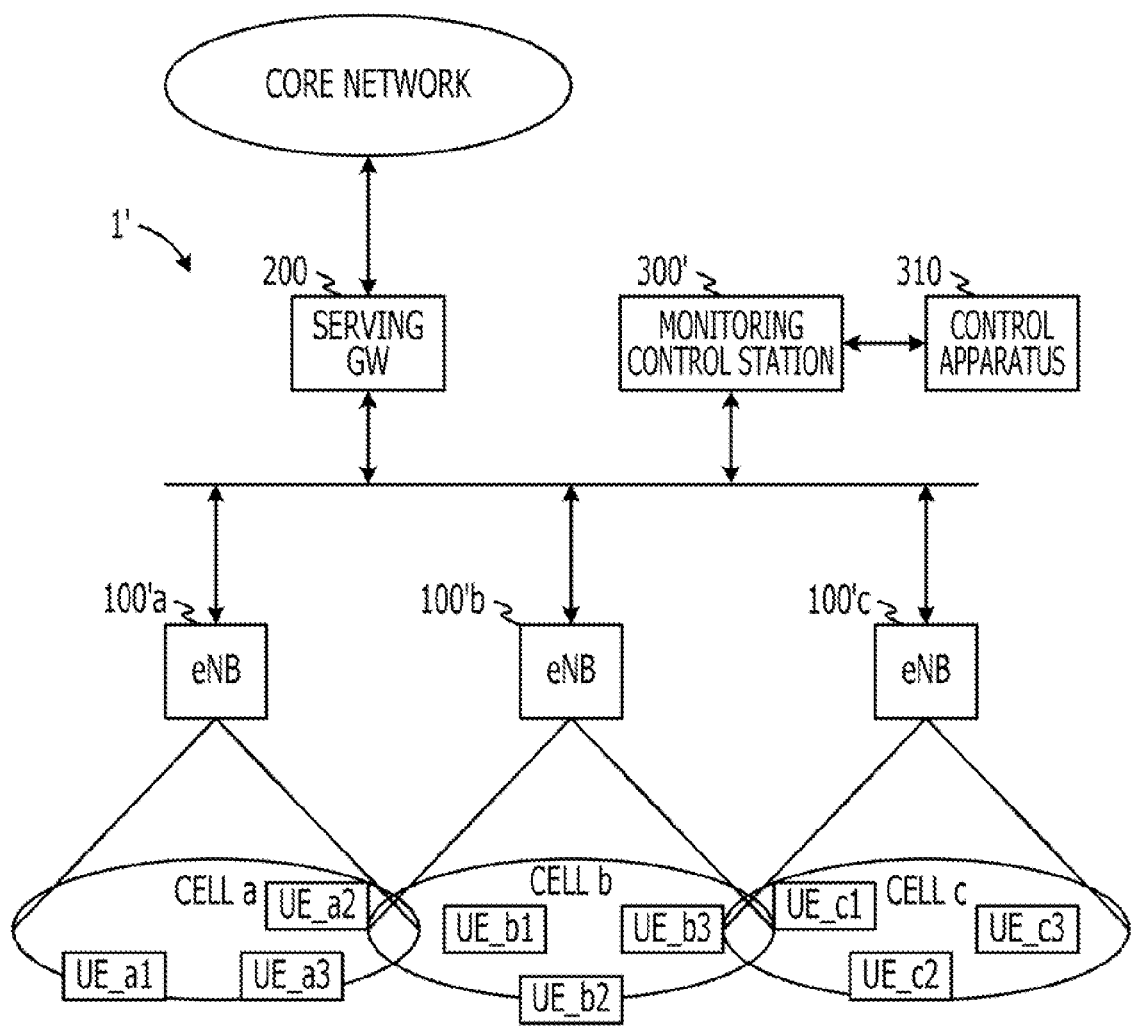
FIG. 8 is a block diagram illustrating an exemplary modification of a control apparatus according to an embodiment.

An exemplary modification of the mobile communication system 1 according to an embodiment will be described with reference to FIG. 8. FIG. 8 is a block diagram illustrating the basic configuration of a mobile communication system 1' which is an exemplary modification of the mobile communication system 1 including the eNBs 100, each of which includes the control apparatus 500. In FIG. 8, substantially the same components as those of FIG. 1 are designated by the same reference numbers and the descriptions thereof are omitted. Further, when no distinction is made among eNBs 100'a, 100'b, and 100'c that are illustrated in FIG. 8, the eNBs 100'a to 100'c are expressed as an eNB 100'. Likewise, when no distinction is made among UE_a1 to the UE_c3 that are illustrated in FIG. 8, the UE_a1 to the UE_c3 are expressed as a UE 400.

The mobile communication system 1' illustrated in FIG. 8 includes eNBs 100'a, 100'b, and 100'c, the serving GW 200, a monitoring control station 300', and a control apparatus 310.

As is the case with the eNB 100a, the eNB 100'a is connected to the core network and forms a cell a which is under the eNB 100'a by transmitting a radio wave via an antenna. Further, the eNB 100'a communicates with a UE_a1, a UE_a2, and a UE_a3 existing in the cell a. Further, the eNB 100'a transmits cell information about peripheral eNBs 100' (e.g., the eNBs 100'b and 100'c) transmitted from each of the UEs 400 in communication, to the monitoring control station 300' as appropriate. The eNBs 100'b and 100'c are radio base stations each having the same function and configuration as those of the eNB 100'a.

The monitoring control station 300', which is connected by wire to the eNB 100' and the serving GW 200, and for example, upon being informed of a failure of a device, performs a corresponding process. Further, the monitoring control station 300' is connected to the control apparatus 310 and transmits information transmitted from each eNB 100' to the control apparatus 310, the information including cell information, communication request number information, and so forth.

The control apparatus 310, which has the same configuration as that of the control apparatus 500, classifies and summarizes the information including the cell information, the communication request number information, and so forth for each of the eNBs 100', the information being notified via the monitoring control station 300, and detects and determines an abnormality occurring cell. The hardware configuration and operation flow of the control apparatus 310 may be substantially the same as those of the above described exemplary basic configuration and exemplary operations. The configuration and operations allow the control apparatus 310 to detect and determine an abnormality occurring cell, and to notify the monitoring control station 300' of the determined abnormality occurring cell.

The control apparatus 310 may be provided in the mobile communication system 1 in any manner different from that stated above so long as the above-described advantages can be obtained. For example, another exemplary modification of the control apparatus 310 may be a circuit provided in the monitoring control station 300' or a node device provided on the network, the node device being independent of the monitoring control station 300'.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A radio base station that forms a cell by transmitting a radio wave and that communicates with a plurality of mobile terminals existing in the cell, the radio base station comprising:
   a receiver configured to receive cell information relating to a state of a peripheral cell of the radio base station, the information being transmitted from the plurality of mobile terminals; and
   a processor configured
   to count a number of specified mobile terminals of the plurality of mobile terminals based on the cell information and identification information of the peripheral cell included in the radio wave, the specified mobile terminals of the plurality of mobile terminals having measured a radio wave from the peripheral cell, and
   to detect an abnormality by detecting a change in frequency of the cell information relating to another radio base station corresponding to the peripheral cell based on the number of counted specified mobile terminals,
   wherein upon detecting the abnormality, based on a threshold, identifying another radio base station.

2. The radio base station according to claim 1, wherein
   the processor detects the abnormality relating to the another radio base station corresponding to the peripheral cell based on the number and a frequency of occurrence of the communication request received from a plurality of other mobile terminals than the plurality of mobile terminals.

3. A control apparatus comprising:
   a receiver configured to receive cell information relating to a state of a peripheral cell of a first radio base station, the information being transmitted from a plurality of mobile terminals to the first radio base station; and
   a processor configured to
   count a number of specified mobile terminals of the plurality of mobile terminals based on the cell information and identification information of the peripheral cell included in the radio wave, the specified mobile terminals of the plurality of mobile terminals having measured a radio wave from the peripheral cell, and
   detect an abnormality by detecting a change in frequency of the cell information relating to a second radio base station corresponding to the peripheral cell based on the number of counted specified mobile terminals, wherein upon detecting the abnormality, based on a threshold, identifying another radio base station.

4. The control apparatus according to claim 3, the processor detects the abnormality relating to the second radio base station corresponding to the peripheral cell based on the number and a frequency of occurrence of the communication request received from a plurality of other mobile terminals than the plurality of mobile terminals.

5. A method for detecting an abnormality of a radio base station, the method comprising:

receiving cell information relating to a state of a peripheral cell of a first radio base station, the information being transmitted from a plurality of mobile terminals to the first radio base station;

counting a number of specified mobile terminals of the plurality of mobile terminals based on the cell information and identification information of the peripheral cell included in the radio wave, the specified mobile terminals of the plurality of mobile terminals having measured a radio wave from the peripheral cell, and detecting an abnormality by detecting a change in frequency of the cell information relating to a second radio base station corresponding to the peripheral cell based on the number of counted specified mobile terminals, wherein upon detecting the abnormality, based on a threshold, identifying another radio base station.

6. A method for detecting an abnormality of a radio base station, the method comprising:

receiving cell information relating to a state of each of peripheral cells of a first radio base station, the information being transmitted from a plurality of mobile terminals to the first radio base station;

counting a number of specified mobile terminals of the plurality of mobile terminals based on the cell information and identification information of the peripheral cell included in the radio wave, the specified mobile terminals of the plurality of mobile terminals having measured a radio wave from the peripheral cell, causing the first radio base station to detect an abnormality by detecting a change in frequency of the cell information relating to a second radio base station corresponding to one of the peripheral cells based on the number of counted specified mobile terminals, wherein upon detecting the abnormality, based on a threshold, identifying another radio base station.

7. A mobile communication system comprising:

a plurality of radio base stations each forming a cell by transmitting a radio wave and communicating with a plurality of mobile terminals existing in the cell, and a control apparatus configured to communicate with at least one of the radio base stations, the control apparatus including, a receiver configured to receive cell information relating to a state of each of peripheral cells of a first radio base station among the plurality of radio base stations, the information being transmitted from the plurality of mobile terminals to the first radio base station; and a processor configured to count a number of specified mobile terminals of the plurality of mobile terminals based on the cell information, the specified mobile terminals of the plurality of mobile terminals having measured a radio wave from the peripheral cell, and detect an abnormality by detecting a change in frequency of the cell information relating to a second radio base station corresponding to one of the peripheral cells based on the number of counted specified mobile terminals, wherein upon detecting the abnormality, based on a threshold, identifying another radio base station.

8. The mobile communication system according to claim 7, further comprising a control station coupled to the plurality of radio base stations, wherein the control apparatus notifies the control station of an occurrence of an abnormality relating to the second radio base station, and wherein the control station identifies the second radio base station from among the plurality of radio base stations corresponding to the peripheral cells based on the number in response to the notification.

9. The radio base station according to claim 1, wherein the processor is configured to detect the abnormality by complying the number before the change with the number after the change.

10. The radio base station according to claim 1, wherein the specified mobile terminals measures the radio wave from the peripheral cell based on identification information of the peripheral cell included in the radio wave.

11. The radio base station according to claim 1, wherein the specified mobile terminals include a mobile terminal that does not communicate data with the radio base station.

* * * * *